(12) United States Patent
Aditham et al.

(10) Patent No.: US 7,416,662 B2
(45) Date of Patent: Aug. 26, 2008

(54) CORRUGATED DENSITY BAFFLE

(75) Inventors: Raghuram Aditham, Erie, PA (US); Sib S. Banerjee, Burlington, KY (US); Michael Sjostrom, Ashtabula, OH (US); Dennis Vorse, Girard, PA (US)

(73) Assignee: Molded Fiber Glass Water Treatment Products Co., Union City, PA (US)

( * ) Notice: Subject to any disclaimer, the term of this patent is extended or adjusted under 35 U.S.C. 154(b) by 297 days.

(21) Appl. No.: 11/287,898

(22) Filed: Nov. 28, 2005

(65) Prior Publication Data
US 2007/0138087 A1    Jun. 21, 2007

(51) Int. Cl.
*B01D 21/00* (2006.01)

(52) U.S. Cl. .................. 210/232; 210/521; 210/528; 210/539; 210/541; 220/660; 428/59; 428/182; 428/186; 29/897.32; 52/748.1

(58) Field of Classification Search ............. 210/232, 210/521, 528, 539, 541, 542; 220/4.12, 654, 220/660; 428/59, 182, 184, 186; 29/897, 29/897.3, 897.32; 52/748.1
See application file for complete search history.

(56) References Cited

U.S. PATENT DOCUMENTS

| | | | |
|---|---|---|---|
| 3,773,603 A * | 11/1973 | Scholander | 428/59 |
| 4,391,704 A * | 7/1983 | Anderson | 210/539 |
| 4,437,988 A * | 3/1984 | James | 210/521 |
| 4,722,800 A * | 2/1988 | Aymong | 210/521 |
| 4,767,536 A | 8/1988 | Roley | |
| 5,252,205 A | 10/1993 | Schaller | |
| 5,597,483 A | 1/1997 | Schaller | |
| 5,670,045 A | 9/1997 | Schaller | |
| 5,965,023 A * | 10/1999 | Schaller | 210/541 |
| 6,216,881 B1 * | 4/2001 | Schaller | 210/541 |
| 6,712,222 B2 | 3/2004 | Schaller | |
| 6,974,622 B2 * | 12/2005 | Wade | 428/182 |

\* cited by examiner

*Primary Examiner*—Christopher Upton
(74) *Attorney, Agent, or Firm*—Hahn Loeser & Parks LLP

(57) ABSTRACT

A density baffle assembly for use in a water treatment system is disclosed. The density baffle assembly includes a plurality of density baffles where each density baffle comprises a corrugated panel member having an upper edge, a lower edge, a first lateral side, and a second lateral side, with a corrugated pattern running across the corrugated panel member. Each density baffle also comprises a support flange integrally connected to the upper edge of the corrugated panel member. The support flange may be affixed to a wall of the water treatment system using a fastening means. Adjacent corrugated panel members may be nested together at their lateral sides and secured to each other using a fastening means.

32 Claims, 8 Drawing Sheets

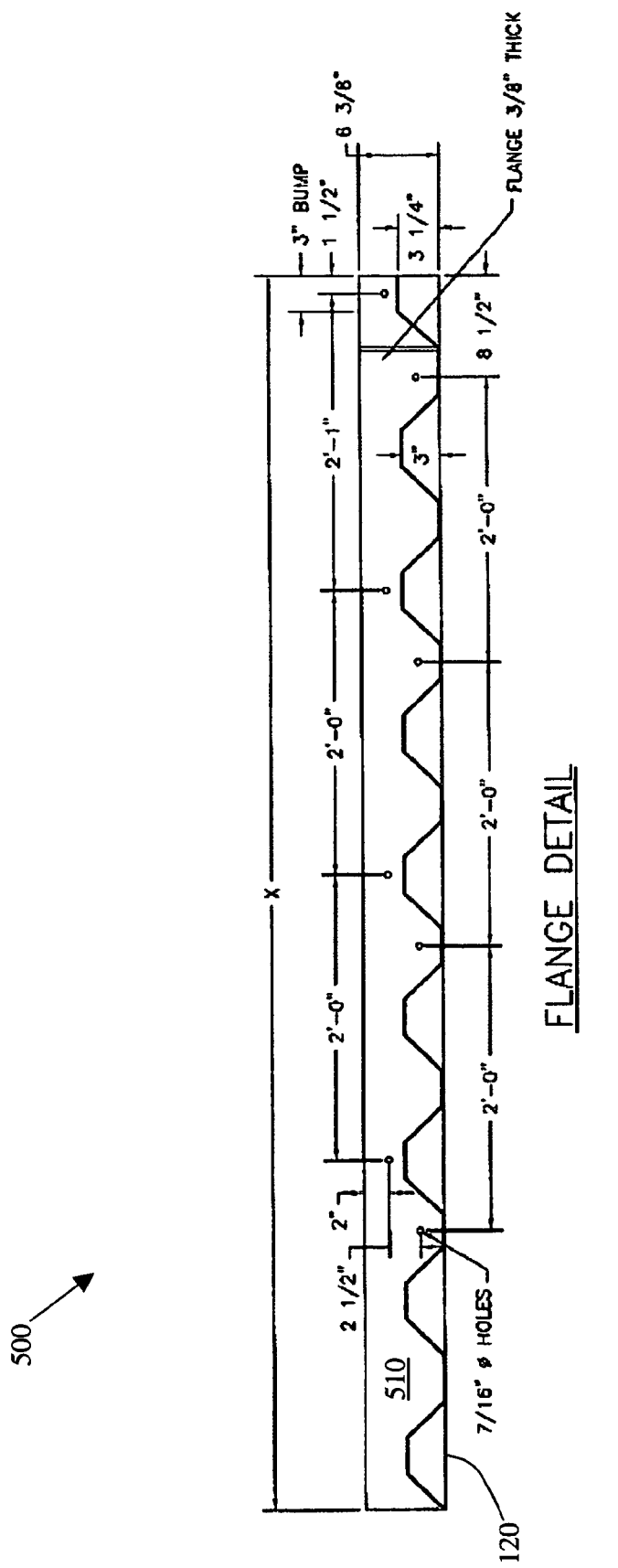

CORRUGATED DENSITY BAFFLE

CROSS-REFERENCE TO RELATED APPLICATIONS/INCORPORATION BY REFERENCE

U.S. Pat. No. 5,252,205 issued Oct. 12, 1993, is incorporated herein by reference in its entirety.

TECHNICAL FIELD

Certain embodiments of the present invention relate to water treatment systems. More particularly, certain embodiments of the present invention relate to a density baffle assembly to gravitationally separate solids suspended in a liquid contained in a water treatment system.

BACKGROUND OF THE INVENTION

U.S. Pat. No. 5,252,205 (the '205 patent), which is incorporated herein by reference in its entirety, is directed to a unitary clarifier baffle and integrated baffle system. The '205 patent describes a baffle system comprising a plurality of baffles. Each baffle includes a downwardly sloping flat panel member and an integral end bracket on a first lateral side of the panel member. The integral end bracket is used to attach one side of the panel member to a tank wall of a clarifier tank and to attach the panel member to an adjacent panel member. The end brackets also provide additional support for the panel members to help stiffen the panel members along the length and width of the panel members.

It is desirable to provide a density baffle assembly that is independent of any end brackets or support brackets such as for example, those type of integral brackets used in the '205 patent, and yet is able to be securely fastened to a tank wall and still have a relatively high level of rigidity across the length and width of the baffles.

Further limitations and disadvantages of conventional, traditional, and proposed approaches will become apparent to one of skill in the art, through comparison of such systems and methods with the present invention as set forth in the remainder of the present application with reference to the drawings.

BRIEF SUMMARY OF THE INVENTION

An embodiment of the present invention includes a density baffle for use in a water treatment system to gravitationally separate solids suspended in a liquid contained in the water treatment system where the water treatment system has a containment vessel bottom and a substantially vertical wall bounding the liquid. The density baffle includes a first corrugated panel member having an upper edge, a lower edge, a first lateral side, and a second lateral side. A corrugated pattern runs laterally across the first corrugated panel member from the first lateral side to the second lateral side. The density baffle also includes a support flange integrally connected to the upper edge of the first corrugated panel member. The support flange may be affixed to a substantially vertical wall of a water treatment system such that the first corrugated panel member slopes downward at an angle away from the substantially vertical wall toward an interior of a containment vessel and a containment vessel bottom of the water treatment system. The first corrugated panel member terminates at the lower edge and may be disposed in space relation to the containment vessel bottom. The first lateral side of the first corrugated panel member terminates at a first location along the corrugated pattern and the second lateral side of the first corrugated panel member terminates at a second location along the corrugated pattern. As a result, a second lateral side of a second corrugated panel member of similar design may be overlapped in a nested manner with the first lateral side of the first corrugated panel member and may be affixed thereto, and a first lateral side of a third corrugated panel member of similar design may be overlapped in a nested manner with the second lateral side of the first corrugated panel member and may be affixed thereto.

A second embodiment of the present invention includes a density baffle assembly for use in a water treatment system to gravitationally separate solids suspended in a liquid contained in the water treatment system. The water treatment system has a containment vessel bottom and a substantially vertical wall bounding the liquid. The density baffle assembly comprises a plurality of baffles mounted on the peripheral wall of the water treatment system. Each baffle comprises a corrugated panel member having an upper edge, a lower edge, a first lateral side, and a second lateral side. A corrugated pattern runs laterally across the corrugated panel member from the first lateral side to the second lateral side. The first lateral side of the corrugated panel member terminates at a first location along the corrugated pattern and the second lateral side terminates at a second location along the corrugated pattern. Each baffle also comprises a support flange integrally connected to the upper edge of the corrugated panel member. The support flange may be affixed to a substantially vertical wall of a water treatment system such that the corrugated panel member slopes downward at an angle away from the substantially vertical wall toward an interior of a containment vessel and a containment vessel bottom of the water treatment system. The corrugated panel member terminates at the lower edge and may be disposed in space relation to the containment vessel bottom. The plurality of baffles are able to be secured together in end-to-end relation such that a first lateral side of any one corrugated panel member may be overlapped in a nested manner with a second lateral side of a first adjacent corrugated panel member and may be affixed thereto. Also, a second lateral side of any one corrugated panel member may be overlapped in a nested manner with a first lateral side of a second adjacent corrugated panel member and may be affixed thereto.

A third embodiment of the present invention includes a method of installing a density baffle assembly in a water treatment system to gravitationally separate solids suspended in a liquid contained in the water treatment system. The water treatment system has a containment vessel bottom and a substantially vertical wall bounding the liquid. The method comprises securing to the substantially vertical wall a first baffle having a corrugated panel member including an upper edge, a lower edge, a first lateral side, and a second lateral side. A corrugated pattern runs laterally across the corrugated panel member from the first lateral side to the second lateral side. The first lateral side of the corrugated panel member terminates at a first location along the corrugated pattern and the second lateral side of the corrugated panel member terminates at a second location along the corrugated pattern. A support flange is integrally connected to the upper edge of the corrugated panel member for securing the corrugated panel member to the substantially vertical wall such that the corrugated panel member slopes downward at an angle away from the substantially vertical wall toward an interior of a containment vessel and a containment vessel bottom of the water treatment system. The corrugated panel member terminates at the lower edge and may be disposed in space relation to the containment vessel bottom. The method further includes securing a second baffle to the substantially vertical wall and, in end-to-end immediately-adjacent nested relation therewith, to the first baffle wherein the second baffle is similar in design to the first baffle. A second lateral side of a corrugated panel member of the second baffle is overlapped in a nested manner with the first lateral side of the corrugated panel member of the first baffle and is affixed thereto. A support flange of the second baffle is integrally connected to an upper edge of the corrugated panel member of the second baffle for securing the corrugated panel member of the second baffle to the substantially vertical wall such that the corrugated panel member of the second baffle slopes downward at an angle away from the substantially vertical wall toward the interior of the containment vessel and the containment vessel bottom of the water treatment system. The corrugated panel member of the second baffle terminates at a lower edge and may be disposed in space relation to the containment vessel bottom.

A fourth embodiment of the present invention includes a density baffle for use in a water treatment system to gravitationally separate solids suspended in a liquid contained in the water treatment system where the water treatment system has a tank bottom and a peripheral structure bounding the liquid. The density baffle includes a first corrugated panel member having an upper edge, a lower edge, a first lateral side, and a second lateral side. A corrugated pattern runs down the first corrugated panel member from the upper edge to the lower edge. The density baffle also includes a support flange integrally connected to the upper edge of the first corrugated panel member. The support flange may be affixed to a structure of a water treatment system such that the first corrugated panel member slopes downward and away from the vertical peripheral wall toward an interior of a tank and a tank bottom of the water treatment system. The first corrugated panel member terminates at the lower edge and may be disposed in space relation to the tank bottom. The upper edge of the first corrugated panel member terminates at a first location along the corrugated pattern and the lower edge of the first corrugated panel member terminates at a second location along the corrugated pattern. As a result, a second lateral side of a second corrugated panel member of similar design may be overlapped in a nested manner with the first lateral side of the first corrugated panel member and may be affixed thereto, and a first lateral side of a third corrugated panel member of similar design may be overlapped in a nested manner with the second lateral side of the first corrugated panel member and may be affixed thereto.

These and other advantages and novel features of the present invention, as well as details of illustrated embodiments thereof, will be more fully understood from the following description and drawings.

BRIEF DESCRIPTION OF SEVERAL VIEWS OF THE DRAWINGS

FIG. 5 illustrates a flange detail of the density baffle of FIG. 1, in accordance with an embodiment of the present invention.

DETAILED DESCRIPTION OF THE INVENTION

Figure 1:
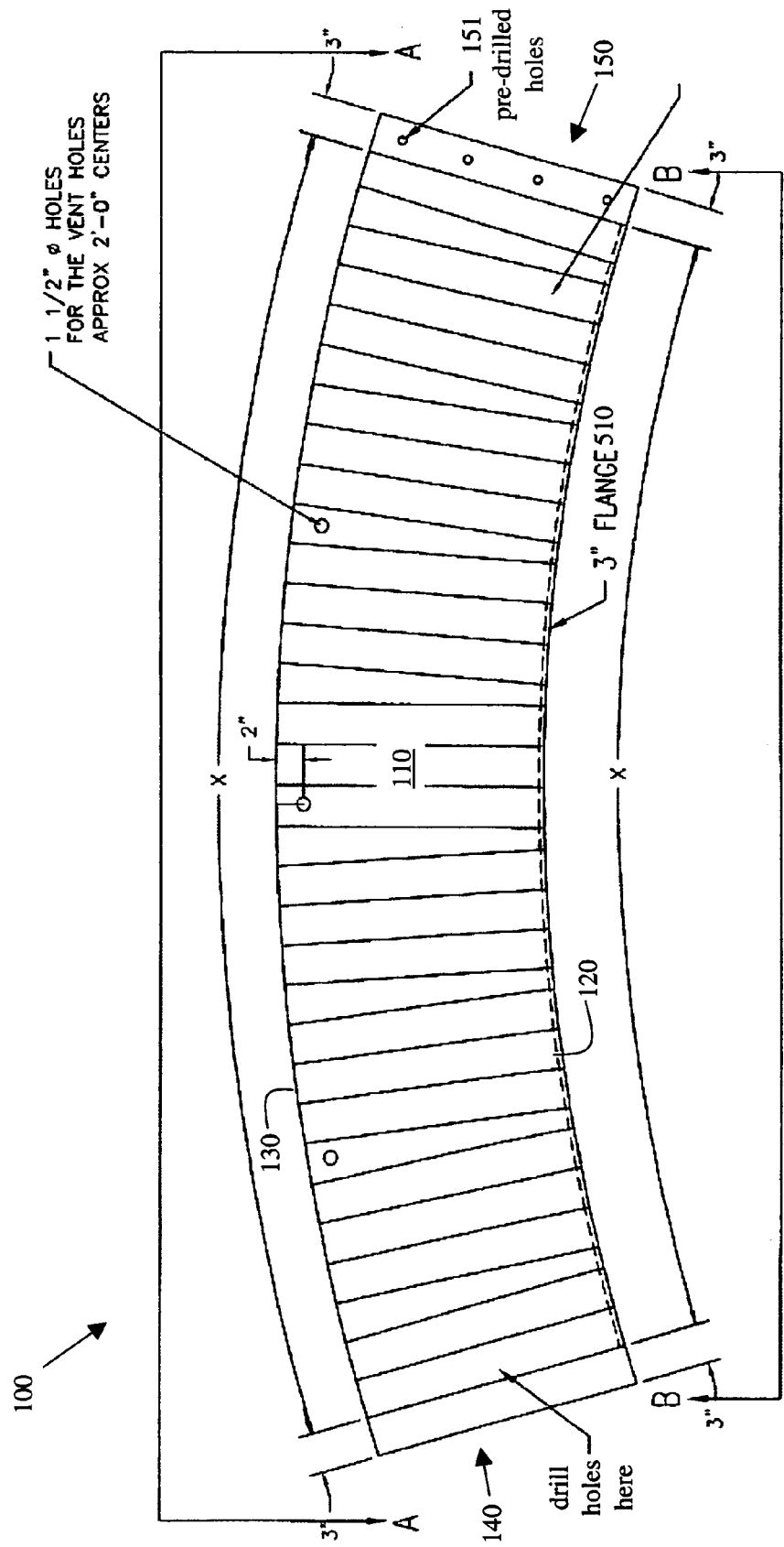
FIG. 1 illustrates an exemplary embodiment of a corrugated panel member of a density baffle, in accordance with various aspects of the present invention.
Figure 2:
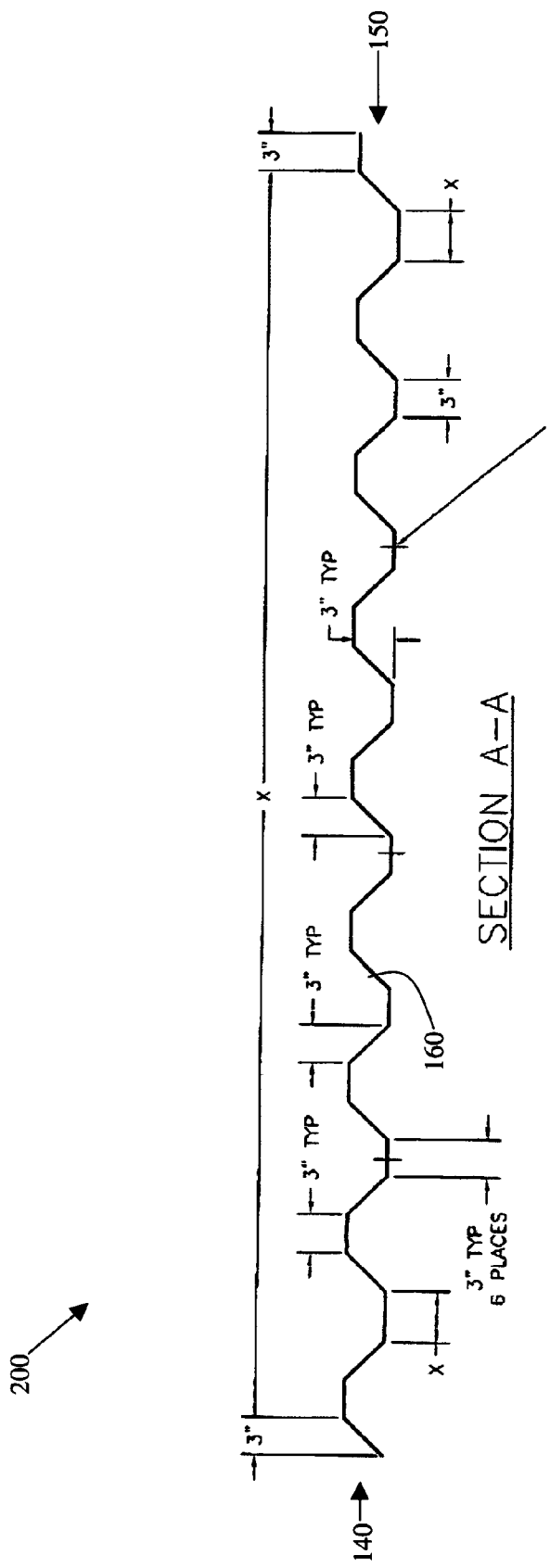
FIG. 2 illustrates a first section through the corrugated panel member of FIG. 1, in accordance with an embodiment of the present invention.
Figure 3:
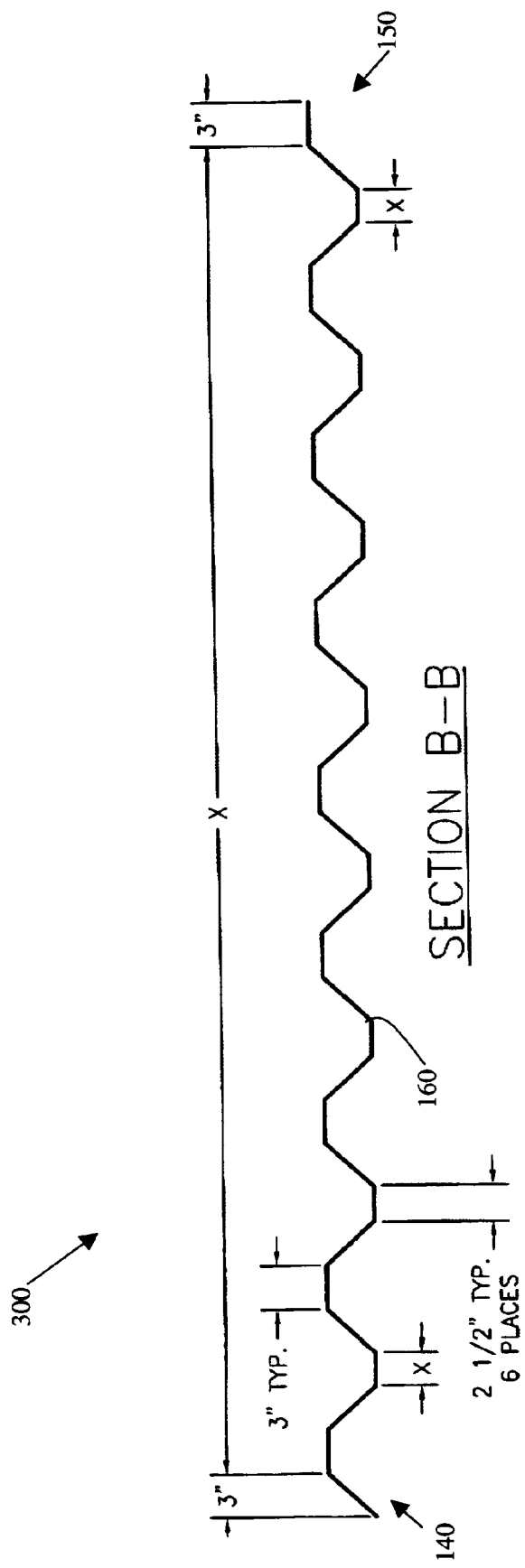
FIG. 3 illustrates a second section through the corrugated panel member of FIG. 1, in accordance with an embodiment of the present invention.

FIG. 1 illustrates an exemplary embodiment of a corrugated panel member 110 of a density baffle 100, in accordance with various aspects of the present invention. FIG. 2 illustrates a first section 200 through a lower portion of corrugated panel member 110 of FIG. 1, in accordance with an embodiment of the present invention. FIG. 3 illustrates a second section 300 through an upper portion of the corrugated panel member 110 of FIG. 1, in accordance with an embodiment of the present invention.

Figure 4A:
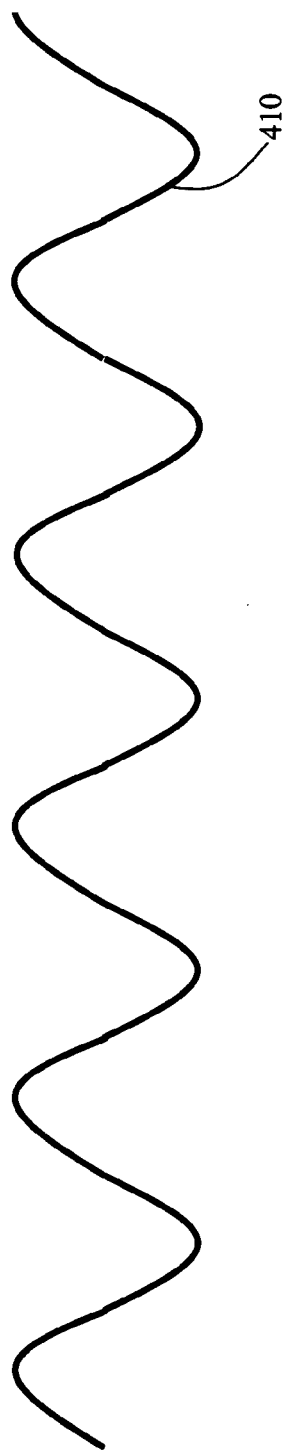
FIGS. 4a-4b illustrate embodiments of exemplary alternative corrugated patterns, in accordance with various aspects of the present invention.
Figure 4B:
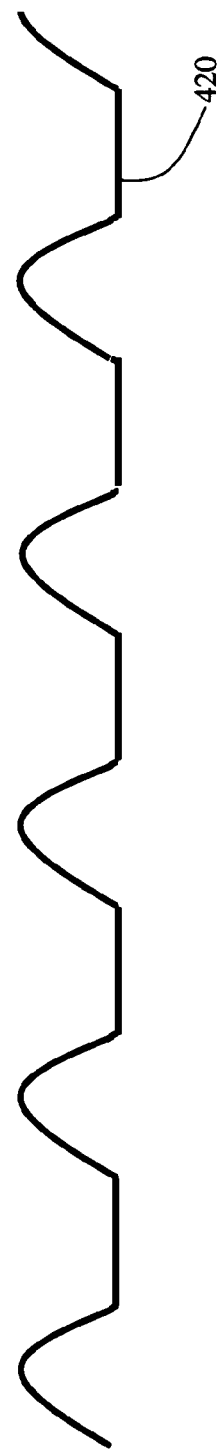

The corrugated panel member 110 includes an upper edge 120, a lower edge 130, a first lateral side 140, and a second lateral side 150. A corrugated pattern 160 runs from the first lateral side 140 to the second lateral side 150 of the corrugated panel member 110. The corrugated pattern 160 shown in FIG. 2 and FIG. 3 may be described as a trapezoidal type of pattern. Other types of corrugated patterns are possible as well such as, for example, a sinusoidal pattern 410 or a truncated sinusoidal pattern 420 as shown in FIGS. 4a-4b. By making the panel member 110 corrugated instead of, for example, flat or smooth, the panel member 110 becomes more rigid and is able to handle larger loads (e.g., water coming up from beneath the panel member 110 in a water treatment system or snow accumulating on top of the panel member 110) without flexing very much if at all. As a result, brackets such as, for example, the end brackets used in the '205 patent are not needed in the present invention. In accordance with an alternative embodiment of the present invention, the corrugated pattern may run from the upper edge 120 to the lower edge 130.

In accordance with an embodiment of the present invention, the overall length of the corrugated panel member 110 (from lateral side 140 to lateral side 150) may be about eight feet. Other lengths are possible as well. The overall depth of the corrugated panel member 110 (from upper edge 120 to lower edge 130) may typically be anywhere from eighteen inches to five feet, in accordance with various embodiments of the present invention. Other depths are possible as well. The thickness of the material of the corrugated panel member 110 may typically be about an eighth of an inch, in accordance with an embodiment of the present invention. Other thicknesses are possible as well. The height of the corrugated panel member 110 (from the bottom of a trough to the top of a peak) may be about three and one quarter inches, in accordance with an embodiment of the present invention. Other heights are possible as well.

FIG. 5 illustrates a flange detail 500 of the density baffle 100 of FIG. 1, in accordance with an embodiment of the present invention. A support flange 510 is integrally connected to (e.g., integrally molded to) the front edge 120 of the corrugated panel member 110. The support flange 510 extends across the length of the front edge 120 and is used to secure or affix the density baffle 100 to a substantially vertically oriented wall of a water treatment system. In accordance with an embodiment of the present invention, the support flange 510 is substantially rectangular in shape and may be curved to fit along a curved wall of a water treatment system (e.g., see the curved upper edge 120 and associated flange 510 in FIG. 1). The wall of the water treatment system may be made of concrete, steel, fiberglass, or any other material that can provide the structural integrity needed with such a wall. In accordance with an alternative embodiment of the present invention, the corrugated panel member and support flange may be straight (not curved) to correspond to a containment vessel (e.g., a tank, a trough, a launder) in a water treatment system with straight walls, for example. Other custom shapes are possible as well. In accordance with an embodiment of the present invention, a height of the support flange 510 may be about eight inches. Other heights are possible as well.

Figure 6:
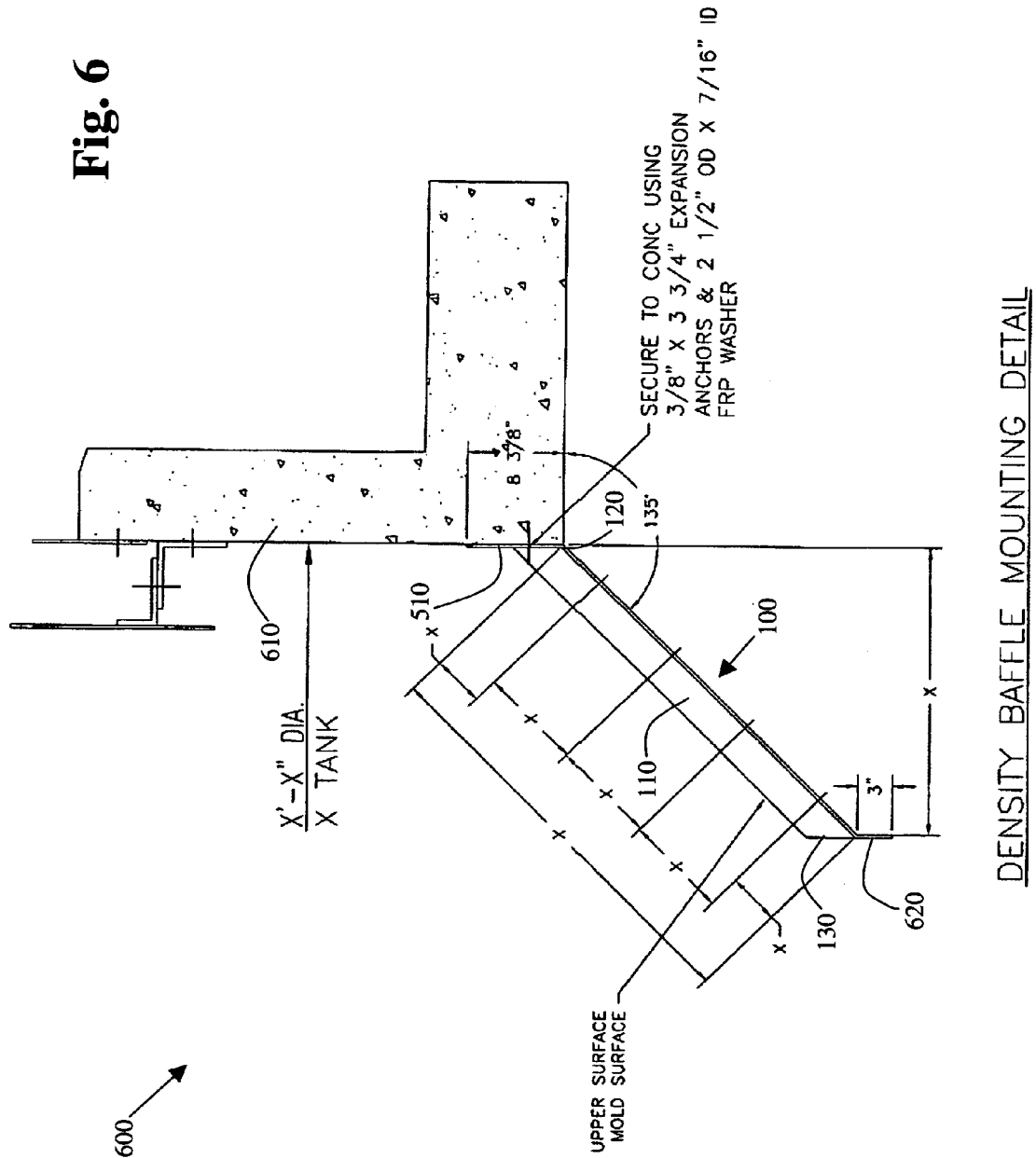
FIG. 6 illustrates an exemplary installation embodiment of the density baffle of FIG. 1, in accordance with various aspects of the present invention.

FIG. 6 illustrates an exemplary installation embodiment 600 of the density baffle 100 of FIG. 1, in accordance with various aspects of the present invention. The installation embodiment 600 shows the density baffle 100 connected to a substantially vertical peripheral wall 610 of a water treatment system via the support flange 510. Fastening means such as screws or bolts may be used to affix the support flange 510 to the wall 610. Other fastening means are possible as well, in accordance with various embodiments of the present invention. The corrugated panel member 110 slopes downward at an angle away from the vertical peripheral wall 610 toward an interior of a containment vessel and a containment vessel bottom (not shown) of the water treatment system. The containment vessel may be, for example, a tank, a trough, or a launder of the water treatment system. The lower edge 130 of the corrugated panel member 110 terminates before reaching the containment vessel bottom such that there is a space disposed between the lower edge 130 and the containment vessel bottom. Typically, the space between the lower edge 130 and the containment vessel bottom may be several inches to several feet. Other spacings are possible as well. The downward slope may be at any acute angle from horizontal, in accordance with various embodiments of the present invention. In accordance with a particular embodiment of the present invention, the downward slope is 45 degrees measured from horizontal.

As an option, the density baffle 100 includes a rigidizing flange 620 integrally connected to the lower edge 130 of the corrugated panel member 110. The rigidizing flange 620 may extend downward and be parallel to the support flange 510, in accordance with an embodiment of the present invention. The rigidizing flange 620 helps to make the corrugated panel member 110 even more rigid so the corrugated panel member may stand up even better to loads impinging on the corrugated panel member such as, for example, water coming up from below the corrugated panel member 110 and snow accumulating on top of the corrugated panel member 110. In accordance with an embodiment of the present invention, the rigidizing flange 620 may have a height of about three inches. Other heights are possible as well. An entire density baffle assembly comprises a plurality of baffles 100 mounted adjacent to each other and to a vertical peripheral wall 610. In accordance with an alternative embodiment of the present invention, the density baffles may not be connected directly to a wall but may instead be connected to some intermediate supporting structure which is connected directly to a wall.

Figure 7:
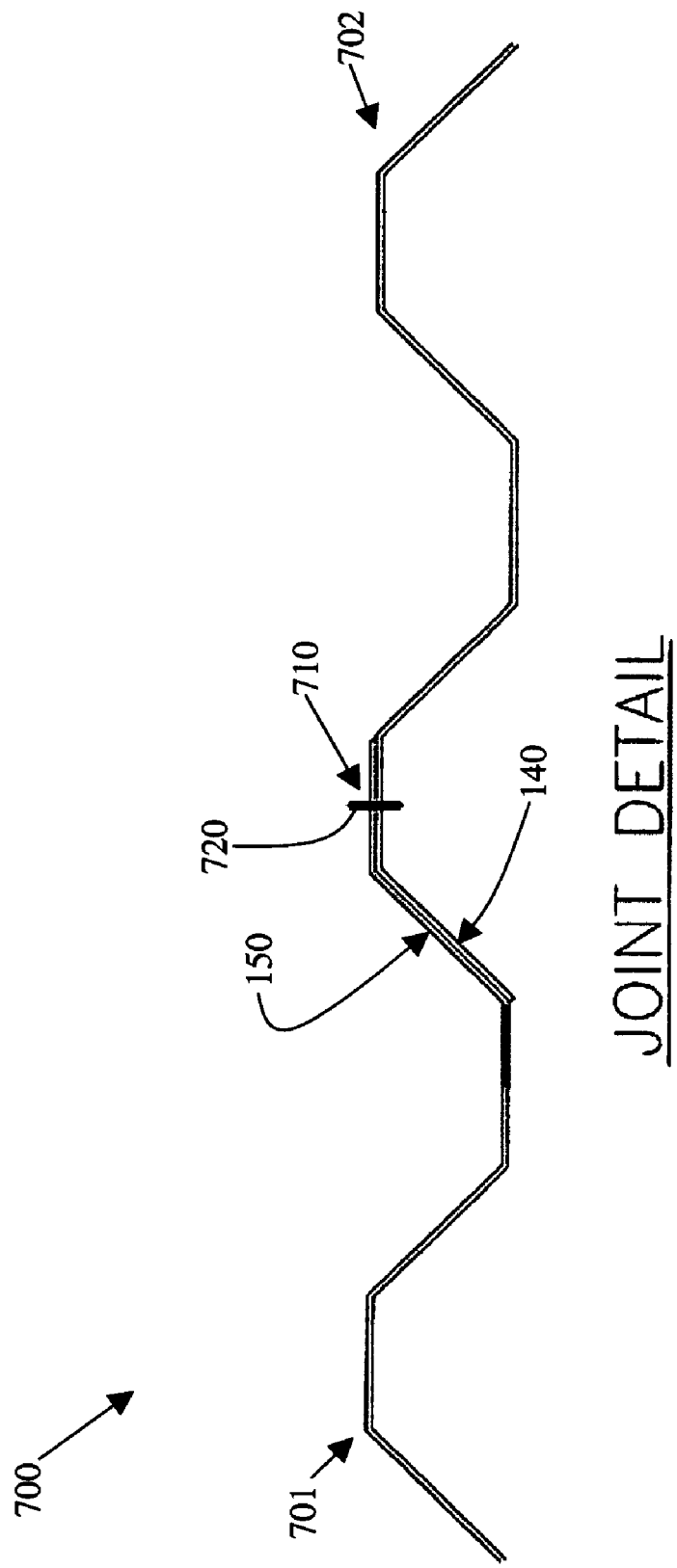
FIG. 7 illustrates an exemplary embodiment of a joint detail showing how lateral sides of two density baffles of the type of FIG. 1 may be nested together and joined, in accordance with various aspects of the present invention.

FIG. 7 illustrates how two adjacent density baffles 701 and 702 being of similar (if not identical) design to density baffle 100 may be affixed to each other without the use of an end bracket as in the '205 patent. A second lateral side 150 of the corrugated panel member of the second density baffle 701 is overlapped in a nested manner with the first lateral side 140 of the corrugated panel member of the first density baffle 702 and affixed thereto to form at least a portion of a density baffle assembly 700. The corrugated pattern or shape on the lateral sides of the panel members are taken advantage of to nest the two lateral ends into each other. A separate bracket or joining structure is not needed. The nested lateral ends are affixed or secured to each other at, for example, position 710 using a fastening means 720 such as, for example, rivets, screws, bolts, or cotter pins along the width of the adjacent panel members from the upper edge toward the lower edge. Other fastening means are possible as well, in accordance with various embodiments of the present invention. As seen in FIG. 1, holes 151 may be pre-drilled into lateral side 150 and/or lateral side 140 for accepting the fastening means 720. Additional density baffles may be added in a similar manner to form a complete density baffle assembly.

Figure 8:
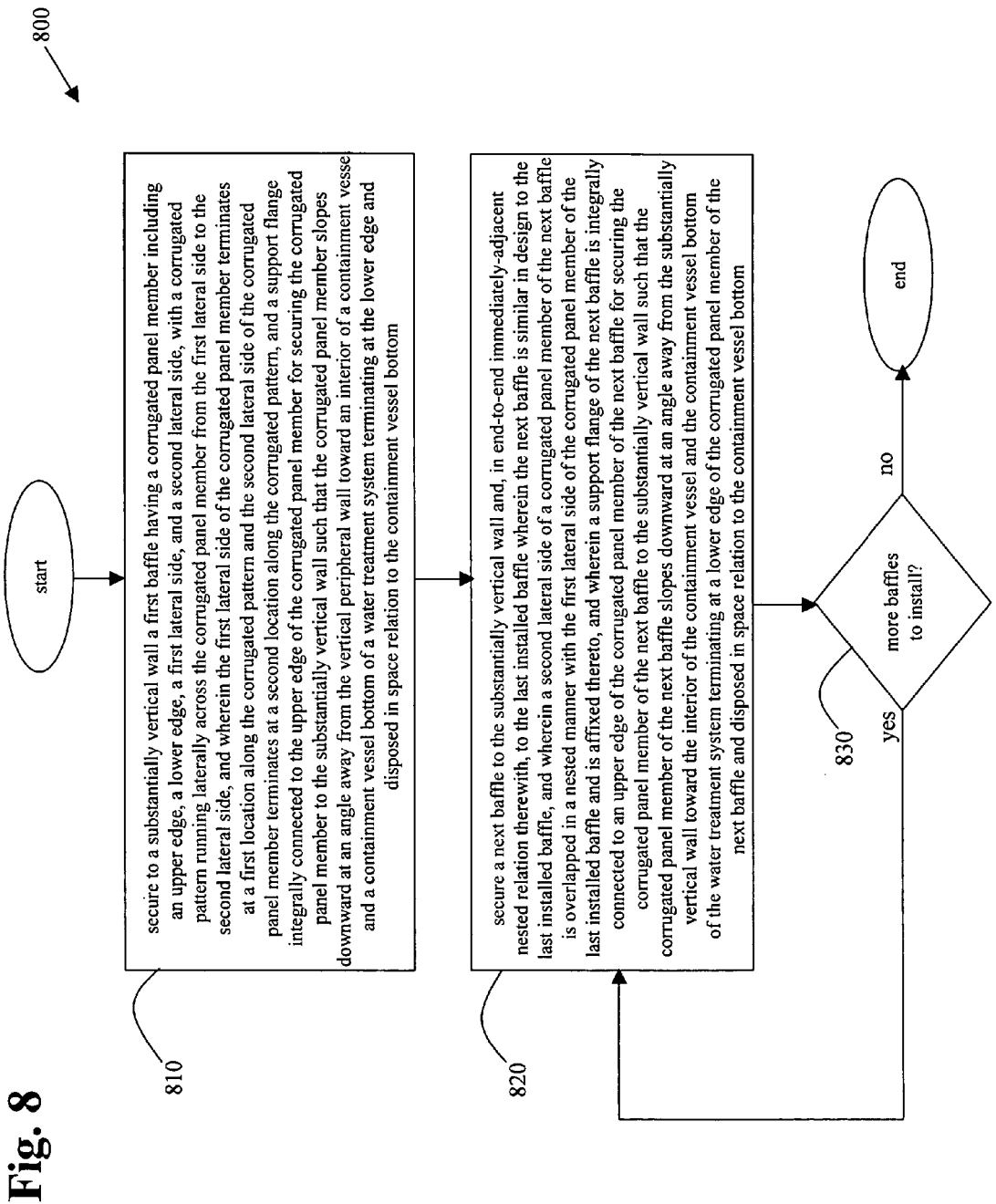
FIG. 8 is a flowchart of an exemplary embodiment of a method of installing a density baffle assembly in a water treatment system, in accordance with various aspects of the present invention.

FIG. 8 is a flowchart of an exemplary embodiment of a method of installing a density baffle assembly in a water treatment system to gravitationally separate solids suspended in a liquid contained in the water treatment system. The water treatment system includes a containment vessel bottom and a substantially vertical peripheral wall bounding the liquid. In step 810, a first baffle is secured to the vertical peripheral wall wherein the first baffle has a corrugated panel member including an upper edge, a lower edge, a first lateral side, and a second lateral side. A corrugated pattern runs laterally across the corrugated panel member from the first lateral side to the second lateral side. The first lateral side of the corrugated panel member terminates at a first location along the corrugated pattern and the second lateral side of the corrugated panel member terminates at a second location along the corrugated pattern. A support flange is integrally connected to the upper edge of the corrugated panel member for securing the corrugated panel member to the vertical peripheral wall such that the corrugated panel member slopes downward and away from the vertical peripheral wall toward and interior of a containment vessel and a containment vessel bottom of the water treatment system, terminating at the lower edge and disposed in space relation to the containment vessel bottom.

In step 820, a next baffle is secured to the vertical peripheral wall in end-to-end immediately-adjacent nested relation therewith to the last installed baffle wherein the next baffle is similar in design to the last installed baffle. A second lateral side of a corrugated panel member of the next baffle is overlapped in a nested manner with the first lateral side of the corrugated panel member of the last installed baffle and is affixed thereto. A support flange of the next baffle is integrally connected to an upper edge of the corrugated panel member of the next baffle for securing the corrugated panel member of the next baffle to the vertical peripheral wall such that the corrugated panel member of the next baffle slopes downward and away from the vertical peripheral wall toward an the interior of the containment vessel and a containment vessel bottom of the water treatment system, terminating at a lower edge of the corrugated panel member of the next baffle and disposed in space relation to the containment vessel bottom.

In step 830, a decision is made to determine if an additional density baffle is to be added to the density baffle assembly in a similar manner. If so, the method 800 reverts back to step 820. This is repeated until a complete density baffle assembly is installed. The resulting corrugated density baffle assembly provides a corrugated, rigid, inwardly and downwardly sloping corrugated surface along which solids precipitated from a liquid-solid suspension contained in a containment vessel of a water treatment system are gravitationally-directed to the containment vessel bottom.

In accordance with an embodiment of the present invention, the corrugated panel member 110 and the support flange 510 of the density baffle 100 are unitarily molded of a fiber glass composite material (i.e., molded as a single piece). In accordance with another embodiment of the present invention, the corrugated panel member 110, the support flange 510, and the rigidizing flange 610 of the density baffle 100 are unitarily molded of a fiber glass composite material (i.e., molded as a single piece). In accordance with various alternative embodiments of the present invention, other materials may be used for the corrugated panel member 110, the support flange 510, and the rigidizing flange 610 such as, for example, steel, plastic, PVC, or aluminum.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In a water treatment system to gravitationally separate solids suspended in a liquid contained in said water treatment system, the water treatment system having a containment vessel bottom and a substantially vertical wall bounding the liquid, the improvement comprising density baffle comprising:

a first corrugated panel member having an upper edge, a lower edge, a first lateral side, and a second lateral side, with a corrugated pattern running laterally across said first corrugated panel member from said first lateral side to said second lateral side; and a support flange integrally connected to said upper edge of said first corrugated panel member, and wherein said support flange is affixed to a substantially vertical wall of a water treatment system such that said first corrugated panel member slopes downward at an angle away from said substantially vertical wall toward an interior of a containment vessel and a containment vessel bottom of said water treatment system terminating at said lower edge and disposed in space relation to said containment vessel bottom, and wherein said first lateral side of said first corrugated panel member terminates at a first location along said corrugated pattern and said second lateral side of said first corrugated panel member terminates at a second location along said corrugated pattern such that a second lateral side of a second corrugated panel member of similar design is overlapped in a nested manner with said first lateral side of said first corrugated panel member and is directly affixed thereto without use of an additional support bracket, and such that a first lateral side of a third corrugated panel member of similar design is overlapped in a nested manner with said second lateral side of said first corrugated panel member and is directly affixed thereto without use of an additional joining structure.

2. The density baffle of claim 1 wherein said first corrugated panel member and said support flange are unitarily molded of a fiber glass composite material.

3. The density baffle of claim 1 further comprising a fastening means to affix said support flange to a substantially vertical wall.

4. The density baffle of claim 1 further comprising a fastening means to affix said first lateral side of said first corrugated panel member to a second lateral side of said second corrugated panel member.

5. The density baffle of claim 1 further comprising a fastening means to affix a second lateral side of said first corrugated panel member to a first lateral side of said third corrugated panel member.

6. The density baffle of claim 1 wherein said upper edge of said first corrugated panel member has a radius of curvature which matches a radius of curvature of a substantially vertical wall of the water treatment system.

7. The density baffle of claim 1 wherein said support flange has a radius of curvature which matches a radius of curvature of a substantially vertical wall of the water treatment system.

8. The density baffle of claim 1 further comprising a rigidizing flange integrally connected to said lower edge of said first corrugated panel member.

9. The density baffle of claim 8 wherein said first corrugated panel member, said support flange, and said rigidizing flange are unitarily molded of a fiber glass composite material.

10. The density baffle of claim 1 wherein said downward slope of said first corrugated panel member forms an angle of about 45 degrees with horizontal.

11. In a water treatment system to gravitationally separate solids suspended in a liquid contained in said water treatment system, the water treatment system having a containment vessel bottom and a substantially vertical wall bounding the liquid, the improvement comprising density baffle assembly comprising:

a plurality of baffles mounted on the peripheral wall of the water treatment system, each said baffle comprising:

a corrugated panel member having an upper edge, a lower edge, a first lateral side, and a second lateral side, with a corrugated pattern running laterally across said corrugated panel member from said first lateral side to said second lateral side, wherein said first lateral side of said corrugated panel member terminates at a first location along said corrugated pattern and said second lateral side of said corrugated panel member terminates at a second location along said corrugated pattern; and a support flange integrally connected to said upper edge of said corrugated panel member, and wherein said support flange is affixed to a substantially vertical wall of a water treatment system such that said corrugated panel member slopes downward at an angle away from said substantially vertical wall toward an interior of a containment vessel and a containment vessel bottom of said water treatment system terminating at said lower edge and disposed in space relation to said containment vessel bottom;

said plurality of baffles able to be secured together in end-to-end relation such that a first lateral side of any one corrugated panel member is overlapped in a nested manner with a second lateral side of a first adjacent corrugated panel member and is directly affixed thereto without use of an additional support bracket, and such that a second lateral side of said any one corrugated panel member is overlapped in a nested manner with a first lateral side of a second adjacent corrugated panel member and is directly affixed thereto without use of an additional support bracket.

12. The density baffle assembly of claim 11 wherein each said baffle of said plurality of baffles are unitarily molded of a fiber glass composite material.

13. The density baffle assembly of claim 11 further comprising a fastening means to affix said support flange to said a substantially vertical wall.

14. The density baffle assembly of claim 11 further comprising a fastening means to affix said first lateral side of said any one corrugated panel member to a second lateral side of said first adjacent corrugated panel member.

15. The density baffle assembly of claim 11 further comprising a fastening means to affix said second lateral side of said any one corrugated panel member to a first lateral side of said second adjacent corrugated panel member.

16. The density baffle assembly of claim 11 wherein said upper edge of said corrugated panel member has a radius of curvature which matches a radius of curvature of a substantially vertical wall of the water treatment system.

17. The density baffle assembly of claim 11 wherein said support flange has a radius of curvature which matches a radius of curvature of a substantially vertical wall of the water treatment system.

18. The density baffle assembly of claim 11 wherein each said baffle of said plurality of baffles further comprises a rigidizing flange integrally connected to said tower edge of said corrugated panel member.

19. The density baffle assembly of claim 18 wherein said corrugated panel member, said support flange, and said rigidizing flange are unitarily molded of a fiber glass composite material.

20. The density baffle assembly of claim 11 wherein said downward slope of said corrugated panel member forms an angle of about 45 degrees with horizontal.

21. A method of installing a density baffle assembly in a water treatment system to gravitationally separate solids suspended in a liquid contained in said water treatment system, the water treatment system having a containment vessel bottom and a substantially vertical wall bounding the liquid, said method comprising:

securing to the substantially vertical wall a first baffle having a corrugated panel member including an upper edge, a lower edge, a first lateral side, and a second lateral side, with a corrugated pattern running laterally across said corrugated panel member from said first lateral side to said second lateral side, and wherein said first lateral side of said corrugated panel member terminates at a first location along said corrugated pattern and said second lateral side of said corrugated panel member terminates at a second location along said corrugated pattern, and a support flange integrally connected to said upper edge of said corrugated panel member for securing said corrugated panel member to said substantially vertical wall such that said corrugated panel member slopes downward at an angle away from said substantially vertical wall toward an interior of a containment vessel and a containment vessel bottom of said water treatment system terminating at said lower edge and disposed in space relation to said containment vessel bottom; and securing a second baffle to said substantially vertical wall and, in end-to-end immediately-adjacent nested relation therewith, to said first baffle wherein said second baffle is similar in design to said first baffle, and wherein a second lateral side of a corrugated panel member of said second baffle is overlapped in a nested manner with said first lateral side of said corrugated panel member of said first baffle and is directly affixed thereto without the use of an additional support bracket, and wherein a support flange of said second baffle is integrally connected to an upper edge of said corrugated panel member of said second baffle for securing said corrugated panel member of said second baffle to said substantially vertical wall such that said corrugated panel member of said second baffle slopes downward at an angle away from said substantially vertical peripheral wall toward said interior of said containment vessel and said containment vessel bottom of said water treatment system terminating at a lower edge of said corrugated panel member of said second baffle and disposed in space relation to said containment vessel bottom.

22. The method of claim 21 further comprising securing a third baffle to said substantially vertical wall and, in end-to-end immediately-adjacent nested relation therewith, to said second baffle wherein said third baffle is similar in design to said first baffle and said second baffle, and wherein a second lateral side of a corrugated panel member of said third baffle is overlapped in a nested manner with a first lateral side of said corrugated panel member of said second baffle and is directly affixed thereto without the use of an additional support bracket, and wherein a support flange of said third baffle is integrally connected to an upper edge of said corrugated panel member of said third baffle for securing said corrugated panel member of said third baffle to said substantially vertical wall such that said corrugated panel member of said third baffle slopes downward at an angle away from said substantially vertical wall toward said interior of said containment vessel and said containment vessel bottom of said water treatment system terminating at a lower edge of said corrugated panel member of said third baffle and disposed in space relation to said containment vessel bottom.

23. The method of claim 22 wherein each of said baffles is unitarily molded of a fiber glass composite material.

24. The method of claim 22 wherein a fastening means is provided for each of said baffles to secure said support flange of each of said baffles to said substantially vertical wall.

25. The method of claim 22 wherein a fastening means is provided to affix a first lateral side of said corrugated panel member of said second baffle to a second lateral side of said corrugated panel member of said third baffle.

26. The method of claim 22 wherein an upper edge of said corrugated panel member of each of said baffles has a radius of curvature which matches a radius of curvature of said substantially vertical wall.

27. The method of claim 22 wherein said support flange of each of said baffles has a radius of curvature which matches a radius of curvature of said substantially vertical wall.

28. The method of claim 22 wherein each of said baffles further comprises a rigidizing flange integrally connected to said lower edge of said corrugated panel member of each of said baffles.

29. The method of claim 28 wherein said corrugated panel member, said support flange, and said rigidizing flange of each of said baffles are unitarily molded of a fiber glass composite material.

30. The method of claim 22 wherein said containment vessel comprises one of a tank, a trough, and a launder of said water treatment system.

31. The method of claim 22 wherein said downward slope of said corrugated panel member of each of said baffles forms an angle of about 45 degrees with horizontal.

32. The method of claim 21 wherein a fastening means is provided to affix said first lateral side of said corrugated panel member of said first baffle to a second lateral side of said corrugated panel member of said second baffle.

* * * * *